United States Patent

[11] 3,573,769

[72] Inventor James D. Flora
East Syracuse, N.Y.
[21] Appl. No. 679,005
[22] Filed Oct. 30, 1967
[45] Patented Apr. 6, 1971
[73] Assignee General Electric Company

[54] MAGNETIC HEAD WITH AIR RELIEF SLOTS
11 Claims, 5 Drawing Figs.

[52] U.S. Cl. .......... 340/174.1, 179/100.2
[51] Int. Cl. .......... G11b 5/60, G11b 15/64
[50] Field of Search .......... 179/100.2 (P), 100.2 (C), 100.2 (CA), 100.2 (D); 340/174.1 (E), 174.1 (F); 226/97

[56] References Cited

UNITED STATES PATENTS

| | | | |
|---|---|---|---|
| 2,958,736 | 11/1960 | Akai | 179/100.2 |
| 3,190,970 | 6/1965 | Atsumi | 179/100.2 |
| 3,311,710 | 3/1967 | Murphy et al. | 179/100.2 |
| 2,647,755 | 8/1953 | Townsley | 179/100.2 |
| 2,688,053 | 8/1954 | Barany et al. | 179/100.2 |
| 2,864,892 | 12/1958 | Perkins | 179/100.2 |
| 2,997,547 | 8/1961 | Beachell | 179/100.2 |
| 3,151,796 | 10/1964 | Lipschutz | 179/100.2 |
| 3,155,335 | 11/1964 | Maeder | 179/100.2 |
| 3,170,045 | 2/1965 | Baumeister | 340/174.1 |
| 3,327,916 | 6/1967 | Weidenhammer | 179/100.2 |

*Primary Examiner*—Bernard Konick
*Assistant Examiner*—Vincent P. Canney
*Attorneys*—Norman C. Fulmer, Frank L. Neuhauser and Oscar B. Waddell

ABSTRACT: An improved arrangement is disclosed of magnetic heads and tape for writing, reading, and erasing. The arrangement is particularly advantageous for high-speed tape operation, such as for electronic computers, where reliable operation is required and minimum wear is desired in order to achieve long life for the magnetic heads. A particular angle is disclosed for entry of the tape against the head. One or more air diversion means such as lateral slots are provided in the head to divert the airflow which accompanies the moving tape, thus preventing it from tending to lift the tape out of contact with the head. These air slots may be slanted and/or tapered to direct the diverted airflow in a desired direction. For a dual-gap head, an air relief means is disclosed for use between the gaps. An erase head is adjustably secured to the read-write head, to provide a unitary combination.

INVENTOR:
JAMES D. FLORA,

BY Norman C. Fulmer
HIS ATTORNEY.

MAGNETIC HEAD WITH AIR RELIEF SLOTS

BACKGROUND OF THE INVENTION

In magnetic tape mechanisms, and particularly in high-speed tape mechanisms used in electronic computer systems, the moving tape must pass in close proximity to, or in contact with, one or more magnetic heads such as a writing head, reading head, and erase head. Direct contact of the moving tape against the magnetic gap regions of the writing and reading heads is particularly desirable, in order to achieve accuracy, reliability, and high density (or high frequency) of information on the magnetic tape. Airflow which accompanies the moving tape, particularly at the higher speeds used for electronic computers and other high speed applications, tends to lift the moving tape away from the magnetic gap regions of the heads, thus causing degraded high frequency response and other deleterious effects.

Various ways have been devised for counteracting or preventing this effect, including the use of pressure pads to physically force the tape against the heads; reducing the tape contact area by providing a smaller or sharp crown at the magnetic gap region (the smaller area generates less tape-lifting air pressure); and enclosing the head mechanisms in a partial vacuum. The use of pressure pads tends to increase the head wear, because sufficient pressure must be employed to overcome fluctuations of two variables: the airlift pressure and the pad pressure. The use of a small or sharp crown on the head is often an unsatisfactory compromise, as it tends to increase head wear because of the smaller contact area with the tape, and at the same time it does not completely eliminate the airlift problem. Enclosing the heads and part or all of the tape in a vacuum chamber, while theoretically a solution to the problem, is expensive, bulky, and entails vacuum system maintenance problems.

SUMMARY OF THE INVENTION

Objects of the invention are to provide an improved magnetic tape and head arrangement, to achieve reduced wear hence longer life of the head, to obviate the need for pressure pads, and to otherwise overcome the above-mentioned problems of prior-art devices, and to achieve these objectives with a simple, reliable, and low-cost construction.

The improved assembly of the invention comprises, briefly and in a preferred embodiment, a magnetic head having a magnetic gap at a curved crown portion of the head, and means for guiding a magnetic tape to the head at a wrap angle of approximately 14° to 16°. This provides a minimum of wear-producing friction, consistent with good tape contact at the gap without need for utilizing a pressure pad.

Further in accordance with the invention, each head is provided with one or more air diversion means, preferably in the form of transverse air-relief slots, located just prior to the point of contact of the incoming tape with the head crown, for the purpose of diverting airflow that accompanies the moving tape, so as to prevent this airflow from reaching the gap region and exerting lifting pressure on the tape. Further, these slots may be tapered or slanted, or both, so as to direct the diverted air in a desired direction. For a tandem dual-gap head (write and read gaps), a transverse airflow relief slot is provided between the gaps if the depth of the valley in the head between the gaps is less than approximately the dimension of the radius of the head crowns. Still further, in accordance with the invention, the write and read gaps are included in a single head structure, and an erase head is adjustably fastened to the read-write head. This provides a unitary combination of read-write-erase gaps, which can be replaced or adjusted easily as a unit, and which obviates a need to separately adjust the erase head every time the read-write head position is replaced or adjusted.

DESCRIPTION OF THE PREFERRED EMBODIMENT

Figures 1, 2, 3:
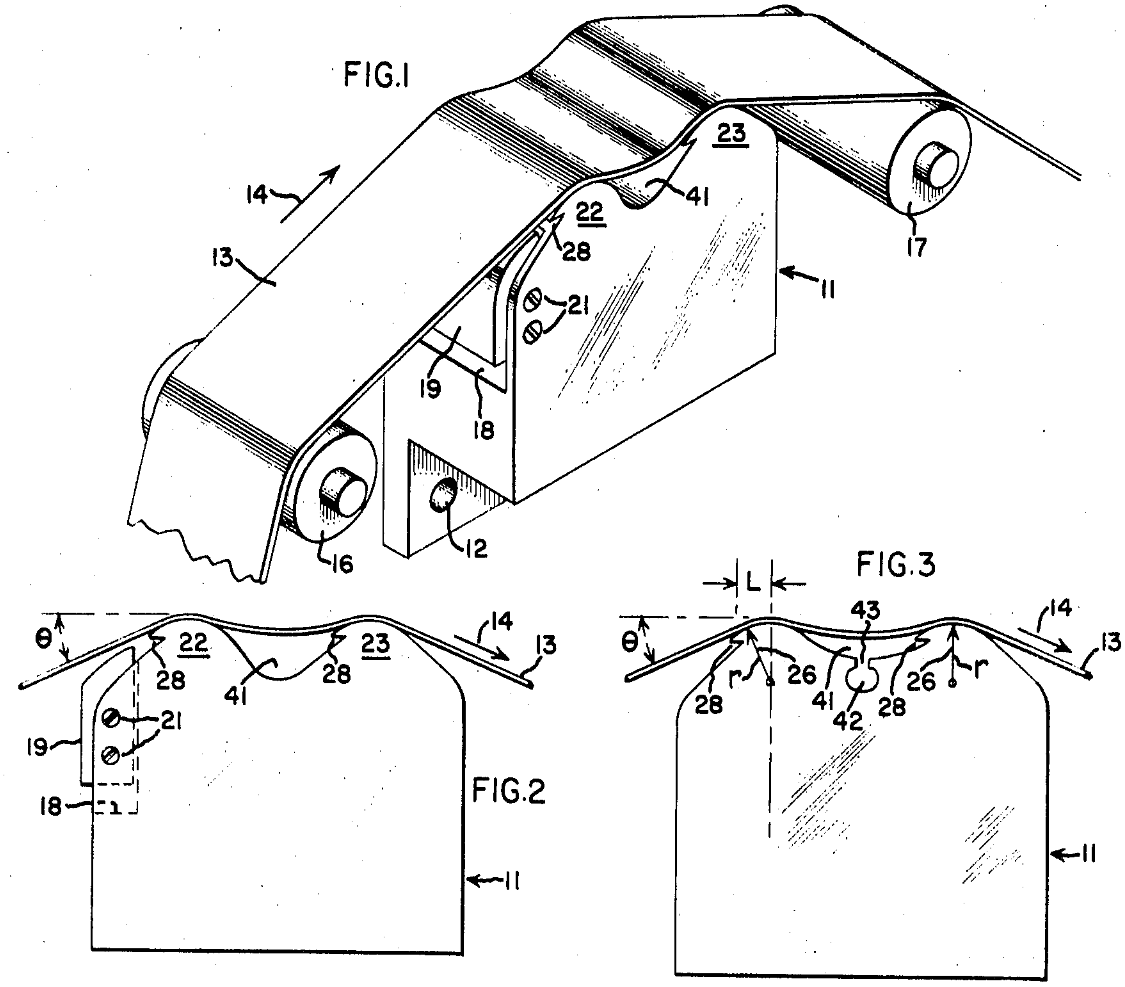
FIG. 1 is a perspective view of a preferred embodiment of the invention.
FIG. 2 is a side view of a portion of the embodiment of FIG. 1.
FIG. 3 is a side view similar to that of FIG. 2, showing an alternative arrangement.

Referring particularly to FIG. 1, the preferred embodiment of the invention comprises a magnetic head unit 11 adapted to be attached to a deck or supporting frame, not shown, by means of screws passed through openings 12 or by other suitable means. A magnetic tape 13 is arranged to move over the head 11 in the direction indicated by the arrow 14, and for this purpose is guided by means of guide rollers 16 and 17. Normally the tape 13 is supplied on a supply reel from which it is unwound and moved over the head 11 by means of a capstan drive or other suitable drive means, whereupon it is wound onto a takeup reel, in conventional manner. A recess 18 is provided in the forward edge of the head 11, and an erase head 19 is positioned in the recess 18 and adjustably secured to the head 11 by means of tightening screws 21 which, when loosened, permit adjustment of the erase head 19, and when tightened secure the erase head in relationship to the main head 11. A suitable magnetic erase gap, not shown, is provided at the top of the erase head 19 adjacent to the tape 14.

The head 11 consists of a writing head crown region 22 and a reading head crown region 23, each of these crown regions being provided with a plurality of pairs 26 (see FIG. 4) of pole pieces separated by narrow gaps for the magnetic flux, and arranged laterally with respect to the tape movement direction 14, in well known manner. The exposed surfaces of the pole pairs 26 are flush with the surface of the head crown in which they are embedded. The writing and reading head crown regions 22 and 23, with their embedded pairs of pole pieces, magnetically write onto, and read from, a plurality of tracks on the magnetic tape 13, in well-known manner.

Each head crown region 22 and 23 is shaped to have a curvature of radius $r$ in the vicinity of tape contact, as indicated by the radius lines 26 in FIG. 3. The length of tape contact with the recording head crown, from point of contact of the tape with the crown to the magnetic gap, is indicated by the letter $L$ as shown in FIG. 3. The angle between the incoming tape and a reference axis extending tangent to the magnetic gaps, is indicated by the symbol $\theta$ as in FIG. 3. In the preferred embodiment of the invention, the radius $r$ is one-fourth of an inch, the length $L$ is 0.05 inch, and the angle $\theta$ is approximately 14° to 16°. It is found that the "wrap angle" $\theta$, in this range, provides a minimum of friction of tape against the head, and hence achieves minimum head wear, consonant with good tape contact with the head at the magnetic reading or writing gaps.

Figure 4:
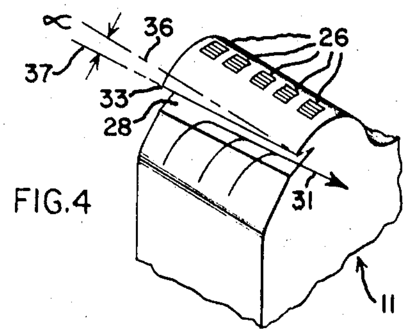
FIG. 4 is a perspective view of a portion of the magnetic head shown in the preceding FIGS., illustrating an alternative embodiment of the invention.
Figure 5:
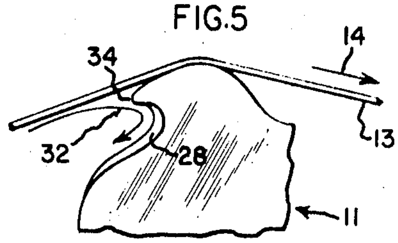
FIG. 5 is a side view of a portion of the magnetic head, showing a further alternative embodiment of the invention.

In accordance with a feature of the invention, air diversion means, preferably in the form of one or more lateral slots 28, are provided at each of the head crown regions 22, 23, just prior to where the incoming tape 13 makes contact against the head crown region, as shown. Preferably the slots are located as close to the tape-to-head contact line as is feasible without danger of the tape scraping against an edge of the slots. The slots 28 are made sufficiently deep and wide, so that, due to their location just prior to the point of contact of the tape 14 with the head crown region, a substantial amount of the airflow which inherently accompanies the rapidly moving tape 13, becomes caught in the slots 28 and is diverted away and prevented from flowing between the region of contact of the tape 13 with the head crown region. By thus diverting the airflow, it is prevented from lifting the tape 13 out of contact with the head crown regions. Suitable dimensions for the slots 28 have been found to be 0.010 inch or greater in depth, and 0.020 inch or greater in width, for tape speeds up to 300 inches per second. If a certain amount of air cushion is desired between the tape and head, the slots 28 can be made smaller or they can be located relatively farther away from the point of tape contact. Two or more slots 28 may be located in succession on the same head crown region, in order to divert the airflow in successive increments, which in certain arrangements will tend to reduce turbulence. The airflow thus diverted by the slots 28, tends to reverse its direction and flow backwardly down the slope of the head, and at the same time flows outwardly toward the outside edges of the head 11, as shown by the airflow arrows 31 and 32 in FIGS. 4 and 5. The exact shape of the slots 28 may be such as to provide a sharp shoulder 33 as shown in FIG. 4, or a rounded shoulder 34 as shown in FIG. 5. Further, in order to divert the airflow toward one side of the head 11, the slots 28 may be slanted or tilted as shown in FIG. 4, the angle of tilt being indicated by the symbol $\alpha$ which is the angle between a horizontal reference axis 36 and the shoulder 33 of the slot 28, along the extension line 37. Alternatively, or in combination with the slanted slot 28 shown in FIG. 4, the slot 28 may be tapered as shown in FIG. 5, in which the slot is shown as being tapered so as to be wider and deeper at the edge toward the viewer. The tilt and/or taper is desirable for directing at least part of the diverted airflow to the open side of the head 11, when the other side is mounted against the support deck for the tape mechanism.

In a dual read-write head as shown in the drawing, it is desirable to provide a valley or recess 41 between the crown regions 22 and 23. This prevents undesirable friction which would occur due to unnecessary contact of the tape with the head material in the region between the crowns 22 and 23. However, in some instances it is desirable that the depth of the valley 41 be as shallow as possible, so that the space between the crown regions 22 and 23 will be substantially filled with metal, to provide shielding between the read and write magnetic gaps. In accordance with a feature of the invention, if the depth of the valley 41 is less than the head crown radius 26 (as in FIG. 3), a lateral air relief slot 42 is provided in the valley 41, to facilitate exit of builtup air pressure from this region. In order to maintain optimum effectiveness of shielding between the crown portions 22 and 23, the air relief slot 42 may communicate with the foot of the valley region 41 by means of a relatively narrower slit 43. One or both ends of the slot 42 communicate to the side edges of the head 11, for dissipation of the air pressure. If the valley depth is greater than the crown radius, as in FIG. 2, an air relief slot is not needed. It will be noted from the drawing that the tape 13 tends to curve slightly into the valley 41. This is due to a combination of factors such as friction, air drag, and gravity if the head 11 is mounted horizontally as shown.

While a preferred embodiment of the invention has been shown and described, various other embodiments and modifications will be apparent to persons skilled in the art, and will fall within the scope of invention as defined in the following claims. For example, the preferred air diversion means 28 is in the form of lateral slots, as has been described. These slots can be made easily and inexpensively, and are easy to inspect and keep clean. However, other air diversion means will also be apparent, such as vanes, shoulders, and one or more openings through the head 11 for diverting the airflow.

I claim:

1. A magnetic head arrangement for use with magnetic tape, including a magnetic head having a first tape contact region provided with at least one reading magnetic gap and a second tape contact region provided with at least one writing magnetic gap, said head being recessed to provide a valley between said first and second tape contact regions, said tape contact regions being arranged in tandem with respect to the direction of tape motion over the head, wherein the improvement comprises an air deflection slot provided at said magnetic head at positions prior to the locations of initial contact of said tape with said tape contact regions, said air deflection slot being adapted to deflect airflow that accompanies the moving tape, and including a slot provided laterally across said head substantially at the bottom of said valley, said last-named slot being adapted to relieve air pressure from said valley.

2. The arrangement as claimed in claim 1, in which said slot is positioned below said valley, and including a slit extending alongside said slot and communicating said slot with said valley, said slit being narrower than said slot thereby to reduce any influence by said slot on the shielding effectiveness between said tape contact regions.

3. The arrangement as claimed in claim 1, including an erase head adjustably attached within a recess provided in said magnetic head in a position for magnetically erasing said tape.

4. The arrangement as claimed in claim 1, in which said air deflection slots provided in said head extend substantially laterally across the width of the head.

5. The arrangement as claimed in claim 4, in which said slots are slanted from true lateral so as to direct the deflected air sideways of said head.

6. The arrangement as claimed in claim 4, in which said slots are tapered so as to direct the deflected air sideways of said head.

7. A magnetic head arrangement for use with magnetic tape, including a magnetic head having a first tape contact region provided with at least one magnetic gap and a second tape contact region, said head being recessed to provide a valley between said first and second tape contact regions, wherein the improvement comprises an air deflection slot provided in said magnetic head at positions prior to the locations of initial contact of said tape with said tape contact regions, said air deflection slot being adapted to deflect airflow that accompanies the tape when moving, and including a second slot provided laterally across said head substantially at the bottom of said valley, said second slot being adapted to relieve air pressure from said valley.

8. The arrangement as claimed in claim 7, in which said second slot is positioned below said valley, and including a slit extending alongside said second slot and communicating said second slot with said valley, said slit being narrower than said second slot thereby to reduce any influence by said second slot on the shielding effectiveness between said tape contact regions.

9. The arrangement as claimed in claim 7, in which said air deflection slot provided in said head extends substantially laterally across the width of the head.

10. The arrangement as claimed in claim 9, in which said slots are slanted from true lateral so as to direct the deflected air sideways of said head.

11. The arrangement as claimed in claim 9, in which said slots are tapered so as to direct the deflected air sideways of said head.